United States Patent
Xue

(10) Patent No.: US 12,292,187 B2
(45) Date of Patent: May 6, 2025

(54) DRYNESS IMPROVING DEVICE AND METHOD FOR IMPROVING DRYNESS OF STEAM OF STEAM INJECTION BOILER

(71) Applicant: BEIJING HUAXI PETROLEUM SERVICE PETROLEUM TECHNOLOGY CO., LTD, Beijing (CN)

(72) Inventor: Bingping Xue, Dongying (CN)

(73) Assignee: BEIJING HUAXI PETROLEUM SERVICE PETROLEUM TECHNOLOGY CO., LTD, Beijing (CN)

(*) Notice: Subject to any disclaimer, the term of this patent is extended or adjusted under 35 U.S.C. 154(b) by 620 days.

(21) Appl. No.: 17/594,381

(22) PCT Filed: Dec. 31, 2019

(86) PCT No.: PCT/CN2019/130531
§ 371 (c)(1),
(2) Date: Oct. 13, 2021

(87) PCT Pub. No.: WO2020/215797
PCT Pub. Date: Oct. 29, 2020

(65) Prior Publication Data
US 2022/0178535 A1    Jun. 9, 2022

(30) Foreign Application Priority Data

Apr. 26, 2019    (CN) .......................... 201910344365.9

(51) Int. Cl.
F23D 11/40    (2006.01)
F22B 37/00    (2006.01)
F23D 11/38    (2006.01)

(52) U.S. Cl.
CPC ............ F23D 11/408 (2013.01); F22B 37/00 (2013.01); F23D 11/38 (2013.01); *F23D 2214/00* (2013.01)

(58) Field of Classification Search
CPC ........ F22B 37/00; F23D 11/38; F23D 11/408; F23D 2214/00
See application file for complete search history.

(56) References Cited

U.S. PATENT DOCUMENTS 4,442,898 A     4/1984   Wyatt
12,098,845 B2 *  9/2024   Wang ..................... F23C 3/004

FOREIGN PATENT DOCUMENTS

CN    2377349 Y    5/2000
CN    2573673 Y    9/2003
(Continued)

OTHER PUBLICATIONS

Partial English Translation of CN 102353033 B (Year: 2013).*
(Continued)

*Primary Examiner* — Charles S Bushey
(74) *Attorney, Agent, or Firm* — Platinum Intellectual Property PC

(57) ABSTRACT

Provided are dryness raiser and method for improving steam dryness of a steam injection boiler. Technical solutions of the dryness raiser and the method are that: a plurality of compressed air circulation holes perpendicular to a front end head are provided in the middle of a flange bolt hole of the front end head in a compressed air inlet passage, and the compressed air inlet passage is connected to a fuel pipe passage by the compressed air circulation holes; and a plurality of compressed air heat dissipation holes are provided in a front end face of the front end head, and are perpendicular to and are connected to the compressed air circulation holes, air heat dissipation nozzles are disposed at tail ends of the compressed air heat dissipation holes, and a (Continued)

plurality of air heat dissipation jet orifices are evenly distributed on circumferences of the air heat dissipation nozzles.

16 Claims, 4 Drawing Sheets

(56) References Cited

FOREIGN PATENT DOCUMENTS

| CN | 2654854 Y | 11/2004 |
| CN | 2769700 | 4/2006 |
| CN | 201013341 Y | 1/2008 |
| CN | 201053311 | 4/2008 |
| CN | 101825279 A | 9/2010 |
| CN | 102174338 A | 9/2011 |
| CN | 102305404 A | 1/2012 |
| CN | 102818250 A | 12/2012 |
| CN | 102353033 B * | 3/2013 |
| CN | 104704194 A | 6/2015 |
| CN | 108079907 A | 5/2018 |
| CN | 110486708 A | 11/2019 |
| CN | 210688172 U | 6/2020 |
| GB | 175785 A | 3/1922 |
| RU | 2649732 C2 | 4/2018 |

OTHER PUBLICATIONS

ISR by the CNIPA of the counterpart PCT application No. PCT/CN2019/130531 dated Mar. 26, 2020, along with English translation.
Written Opinion by the ISA/CN of the counterpart PCT application No. PCT/CN2019/130531 dated Mar. 26, 2020.
First office action of the counterpart Canadian patent application No. 3,136,860, dated Dec. 30, 2022.
First office action of the counterpart Chinese patent application No. 201910730742.2, dated Sep. 8, 2023.
First search report of the counterpart Chinese patent application No. 201910730742.2.
Grant Notice of counterpart Russian patent application No. 2021130467/12(064653) dated May 24, 2022.
Grant Notice of the counterpart Chinese patent application No. 201910730742.2 dated Sep. 21, 2023.
Second office action of the counterpart Canadian patent application No. 3,136,860 dated May 18, 2023.

* cited by examiner

DRYNESS IMPROVING DEVICE AND METHOD FOR IMPROVING DRYNESS OF STEAM OF STEAM INJECTION BOILER

RELATED APPLICATIONS

This application is a United States National Stage Application filed under 35 U.S.C 371 of PCT Patent Application Serial No. PCT/CN2019/130531, filed Dec. 31, 2019, which claims Chinese Patent Application Serial No. CN 201910344365.9, filed Apr. 26, 2019, the disclosure of all of which are hereby incorporated by reference in their entirety.

TECHNICAL FIELD

The present invention relates to an apparatus and a method for improving steam dryness of a steam injection boiler, and in particular, to a dryness raiser and a method for improving steam dryness of a steam injection boiler.

RELATED ART

Currently, steam huff and puff is a major process method for heavy oil thermal recovery. However, with an increase in rounds of the steam huff and puff, a reduction in periodic production becomes increasingly large, problems such as formation voidage and high water content are increasingly severe, and effects of auxiliary stimulations such as injecting nitrogen and carbon dioxide into an oil reservoir are increasingly poor. The invention patent publication No. CN102818250B we have filed discloses a method and an apparatus for improving steam dryness of a steam injection boiler. The process technology makes a great breakthrough in a developing the steam huff and puff. The periodic production of thermal recovery is doubled on average after the process is practiced, water content is reduced by about 15% on average, a production period is extended by 2 to 3 months on average, and a developing cost declines sharply, so that the process technology becomes a succeeding process technology in the mid to late periods of the steam huff and puff of the heavy oil. The dryness raiser discussed in this patent is a specific high-pressure combustion apparatus in a condition of this process, and the following problems exist during actual application:
1. A fuel is poorly atomized at a high pressure.
2. Because the structure of a fuel nozzle is inappropriate, flame flashback occurs to ablate a spray head. The fuel nozzle and the spray head have an integral structure. Once ablation occurs, the entire spray head is damaged, leading to a serious waste.
3. High-pressure combustion generates an ultra-high temperature to ablate equipment.
4. Because the structure of a combustion chamber is inappropriate, flame oscillation takes place to damage the equipment.
5. The apparatus has a feature that high-temperature wet saturated steam is used as a cooling medium, and a conventional sealing structure cannot meet a sealing requirement at a high temperature.
6. The heat dissipation structures of the spray head and the combustion chamber are inappropriate, and the service life of the apparatus is shortened.

SUMMARY

In view of the foregoing disadvantages in the prior art, an objective of the present invention is to provide a dryness raiser and a method for improving steam dryness of a steam injection boiler.

According to the dryness raiser for improving steam dryness of a steam injection boiler provided in the present invention, a technical solution of the dryness raiser is as follows: the dryness raiser mainly includes a front end head (1), a cylinder (2), and a rear end head (3), where the front end head (1) is connected to the cylinder (2) by flanges, and the cylinder (2) is connected to the rear end head (3) by flanges; on an outer edge of a flange of the front end head (1), a plurality of compressed air circulation holes (1.8) perpendicular to the front end head (1) are provided in the middle of a flange bolt hole of the front end head (1) in a compressed air inlet passage (1.3), and the compressed air inlet passage (1.3) is connected to a fuel pipe passage (1.4) by the compressed air circulation holes (1.8); and a plurality of compressed air heat dissipation holes (1.10) are provided in a front end face (1.9) of the front end head (1), the compressed air heat dissipation holes (1.10) are perpendicular to and are connected to the compressed air circulation holes (1.8), air heat dissipation nozzles (1.11) are disposed at tail ends of the compressed air heat dissipation holes (1.10), and a plurality of air heat dissipation jet orifices (1.14) parallel to the front end face (1.9) are evenly distributed on circumferences of the air heat dissipation nozzles (1.11).

Preferably, the middle of a fuel pipe (1.5) forms an annular space with the fuel pipe passage (1.4), and the annular space is connected to the compressed air circulation holes (1.8); and an internal mixing fuel nozzle (1.12) is disposed at a front end of the fuel pipe (1.5), the internal mixing fuel nozzle (1.12) and the fuel pipe (1.5) are an integral structure, and the internal mixing fuel nozzle (1.12) and a tail end of the fuel pipe passage (1.4) are sealed by graphite extrusion.

Preferably, a cooling medium inlet (2.1), a cooling medium connecting pipe (2.2), and a cooling medium passage (2.3) are provided at a front end of the cylinder (2), the cooling medium passage (2.3) is an annular passage, provided in an outer edge of a flange of the front end of the cylinder (2), a plurality of cooling medium circulation holes (2.4) perpendicular to the cylinder (2) are provided in the middle of a flange bolt hole in the cooling medium passage (2.3), and the cooling medium passage (2.3) is connected to the inside of the cylinder (2) by the cooling medium circulation holes (2.4); and the cooling medium inlet (2.1) is connected to the cooling medium connecting pipe (2.2), the cooling medium inlet (2.1) uses a flange connection, the cooling medium connecting pipe (2.2) is connected to the cooling medium passage (2.3) by tangents in two ways, and two tangent intersection points are located on a diameter of the annular passage, and are opposite to each other by 180°.

Preferably, a combustion cylinder (2.5) is disposed inside the cylinder (2), and the combustion cylinder (2.5) is movably connected to a front end of the front end head (1); and the combustion cylinder (2.5) includes a combustion section (2.5.1), a throat section (2.5.2), and a mixing section (2.5.3), a multi-stage volute cooling medium passage (2.5.4) is provided in an outer wall of the combustion section (2.5.1), an annular conical cooling medium passage (2.5.5) is provided in an outer wall of the throat section (2.5.2), a plurality of cooling medium jet orifices (2.5.6) are provided at a tail end of the throat section, the cooling medium jet orifices (2.5.6) are connected to the mixing section (2.5.3), a plurality of composite gas jet orifices (2.5.7) are provided at a conical tail end of the mixing section (2.5.3), and the composite gas jet orifices (2.5.7) are connected to the inside of the cylinder (2).

Preferably, a compressed air inlet (1.1) is connected to a compressed air connecting pipe (1.2), and the compressed air connecting pipe (1.2) is connected to the compressed air inlet passage (1.3); and the compressed air inlet passage (1.3) is an annular passage, provided in the outer edge of the flange of the front end head (1).

Preferably, a safety accessory interface (3.1), a pressure sensor interface (3.2), and a temperature sensor interface (3.3) are disposed on the rear end head (3), and outlets of these interfaces are of diameter-reducing structures.

Preferably, a heat dissipation structure (1.13) is disposed on a rear section of the front end head (1).

Preferably, the compressed air inlet passage (1.3), the fuel pipe passage (1.4), an ignition lever passage (1.6), and a flame detector passage (1.7) are separately connected to the combustion cylinder (2.5), and the fuel pipe (1.5), an ignition lever, a flame detector, and respective corresponding passages are tightly fixed on the front end head (1) by threaded caps in a sealing form of graphite extrusion.

According to a method for using the dryness raiser for improving steam dryness of a steam injection boiler provided in the present invention, technical solutions of the method include the following processes:

during startup, wet saturated steam enters an apparatus from the cooling medium inlet (2.1), compressed air is controlled to enter the apparatus from the compressed air inlet (1.1), and a fuel is then controlled to enter the apparatus from the fuel pipe (1.5); and meanwhile, an igniter is turned on according to setting parameters, the fuel is atomized by the compressed air in the internal mixing fuel nozzle (1.12) and injected into the combustion section (2.5.1) of the combustion cylinder (2.5), and a mixture of the fuel and the air can meet an open flame and combust;

during working, through the compressed air inlet (1.1), the compressed air inlet passage (1.3), and the compressed air circulation holes (1.8), one part of the compressed air enters the annular space formed by the fuel pipe (1.5) and the fuel pipe passage (1.4), and enters the internal mixing fuel nozzle (1.12) through the annular space, to fully atomize the fuel; meanwhile, during circulation, the compressed air adequately dissipates heat of the front end head (1), and an increase in the temperature of the compressed air also facilitates atomization of the fuel; the other part of the compressed air enters the compressed air heat dissipation holes (1.10), is sprayed out at a high speed through the air heat dissipation jet orifices (1.14) that are parallel to the front end face (1.9) and are evenly distributed on the circumferences of the air heat dissipation nozzles (1.11), and forms an air cooling film on a surface of the front end face of the front end head, so as to protect the front end face (1.9) of the front end head (1), an end head of the ignition lever, and an end head of the internal mixing fuel nozzle (1.12) from ablation in a high-temperature combustion state; and the integral structure of the fuel pipe (1.5) and the internal mixing fuel nozzle (1.12) is convenient to disassemble and replace in case that the internal mixing fuel nozzle (1.12) is damaged; and during working, the wet saturated steam enters the annular cooling medium passage (2.3) in directions of inverse tangents, and forms a strong rotational force; under the action of the rotational force, wet saturated steam of a two-phase flow is fully mixed in the annular cooling medium passage (2.3), and through the cooling medium circulation holes (2.4), evenly enters the multi-stage volute cooling medium passage (2.5.4) on an outer wall of the combustion cylinder (2.5); the multi-stage volute cooling medium passage (2.5.4) has a large heat dissipation area, time of circulation of the wet saturated steam on the outer wall of the combustion section (2.5.1) is long, and the wet saturated steam flows uniformly, so as to protect the combustion cylinder (2.5) from ablation of a high temperature; when the wet saturated steam goes through the annular conical cooling medium passage (2.5.5) on the outer wall of the throat section (2.5.2) of the combustion cylinder, the flow velocity of the wet saturated steam increases greatly, thereby ensuring that an interior of the throat section (2.5.2) is not ablated by high temperature flue gas; along the cooling medium jet orifices (2.5.6) at a tail end of the annular conical cooling medium passage (2.5.5), the wet saturated steam is injected into the mixing section (2.5.3) of the combustion cylinder (2.5) at a high speed, and rapidly exchanges heat with the high temperature flue gas after combustion to mix the wet saturated steam and the high temperature flue gas to form a composite gas, so as to greatly increase dryness of the wet saturated steam; according to process requirements, the dryness can be controlled to be increased to 100%, or even to a particular superheat degree, the composite gas is sprayed out from the composite gas jet orifices (2.5.7) at the tail end of the mixing section (2.5.3) of the combustion cylinder (2.5), and the conical structure and the jet orifice structure at the tail end of the mixing section (2.5.3) can ensure that the wet saturated steam and the high temperature flue gas are fully and evenly mixed when being sprayed out through the jet orifices; and a designed structure of the throat section (2.5.2) of the combustion cylinder (2.5) ensures that, after the combusted flue gas goes through the throat section (2.5.2), the flow velocity of the flue gas can approach the velocity of sound, thereby eliminating a phenomenon of flame oscillation in the combustion section (2.5.1), ensuring stable high-pressure combustion, and preventing the wet saturated steam in the mixing section (2.5.3) from flowing back into the combustion section (2.5.1) of the combustion cylinder (2.5) to avoid disturbing stability of flame.

Compared with the prior art, the present invention has the following advantages:

1. With the inlet passage and circulation structure of compressed air of the present invention, the front end head is adequately cooled, and compressed air is also fully preheated during cooling of the front end head, thereby improving atomization and combustion of a fuel. The air heat dissipation nozzles designed on a front end face of the front end head generate an air cooling film on a surface layer of the front end face of the front end head, thereby fully protecting the front end face of the front end head and various inserts from damage due to a high temperature.

2. The internal mixing fuel nozzle of the present invention effectively ensures that the fuel has an adequate atomization effect at a high pressure, and avoids a flame flashback problem. In addition, the fuel pipe and the internal mixing fuel nozzle have an integral structure, it is very convenient to disassemble and replace the nozzle when the nozzle is damaged, thereby greatly reducing operating costs.

3. The passage and circulation structures of a cooling medium of the present invention are applicable to a high-pressure combustion apparatus using room-temperature softened water as the cooling medium, and in particular, to a high-pressure combustion apparatus using high-temperature wet saturated steam as the cooling medium. The wet saturated steam enters the cooling medium passage (an annular passage) in directions of inverse tangents. Under the action of a rotational force, wet saturated steam of a two-phase flow is fully mixed, thereby facilitating cooling of an outer wall of a combustion cylinder by the wet saturated steam.

4. A multi-stage volute cooling medium passage on an outer wall of a combustion section of the combustion cylinder of the present invention has a large heat dissipation area, time of circulation of the cooling medium on the outer wall of the combustion section is long, and the cooling medium flows uniformly, so as to protect the combustion cylinder from ablation of a high temperature. A special structure of the throat section of the combustion cylinder can enable the flow velocity of the combusted flue gas to approach the velocity of sound, thereby eliminating a phenomenon of flame oscillation in the combustion section, ensuring stable high-pressure combustion, and avoiding disturbing stability of flame because of backflow of the cooling medium.

5. For high-pressure combustion equipment using the high-temperature wet saturated steam as the cooling medium, sealing structures that connect the fuel pipe, the ignition lever, the flame detector and other insertion members to the front end head ensure a sealing requirement of the equipment at a high temperature.

Figure 1:
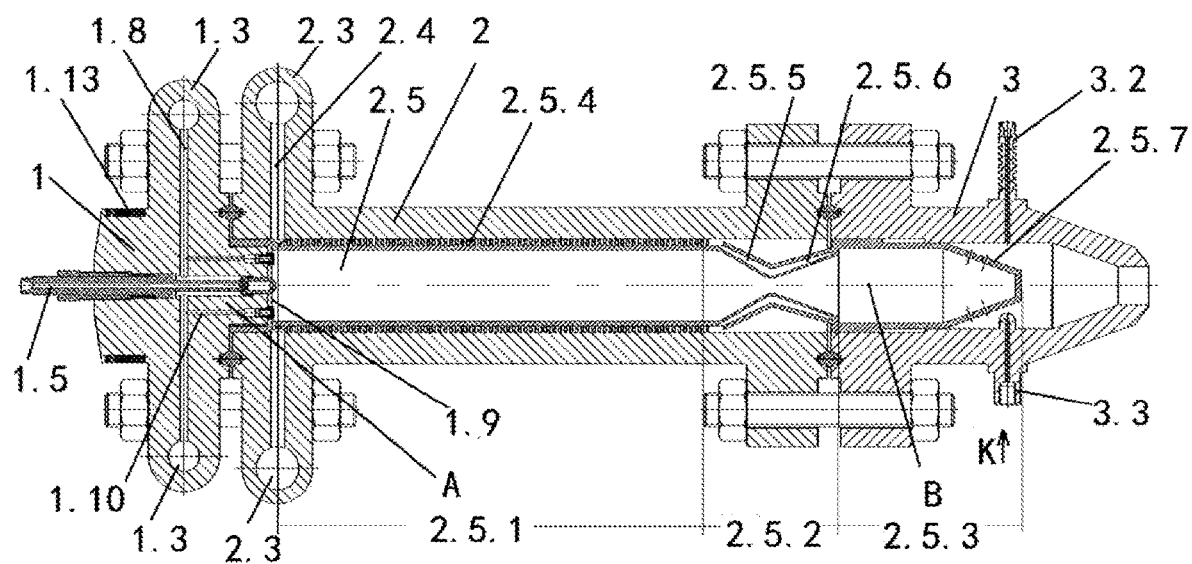
FIG. 1 is a schematic structural diagram of the present invention.

In the above drawings: front end head 1, cylinder 2, rear end head 3, compressed air inlet 1.1, compressed air connecting pipe 1.2, compressed air inlet passage 1.3, fuel pipe passage 1.4, fuel pipe 1.5, ignition lever passage 1.6, flame detector passage 1.7, compressed air circulation holes 1.8, front end face 1.9 of the front end head 1, compressed air heat dissipation holes 1.10, air heat dissipation nozzles 1.11, internal mixing fuel nozzle 1.12, heat dissipation structure 1.13 of the front end head, air heat dissipation jet orifices 1.14, cooling medium inlet 2.1, cooling medium connecting pipe 2.2, cooling medium passage 2.3, cooling medium circulation holes 2.4, combustion cylinder 2.5, combustion section 2.5.1, throat section 2.5.2, mixing section 2.5.3, multi-stage volute cooling medium passage 2.5.4, annular conical cooling medium passage 2.5.5, cooling medium jet orifices 2.5.6, composite gas jet orifices 2.5.7, safety accessory interface 3.1, pressure sensor interface 3.2, and temperature sensor interface 3.3.

DETAILED DESCRIPTION

The present invention is described below in detail with reference to the accompanying drawings. It should be understood that the embodiments described herein are merely used to explain the present invention but are not intended to limit the present invention.

Figure 2:
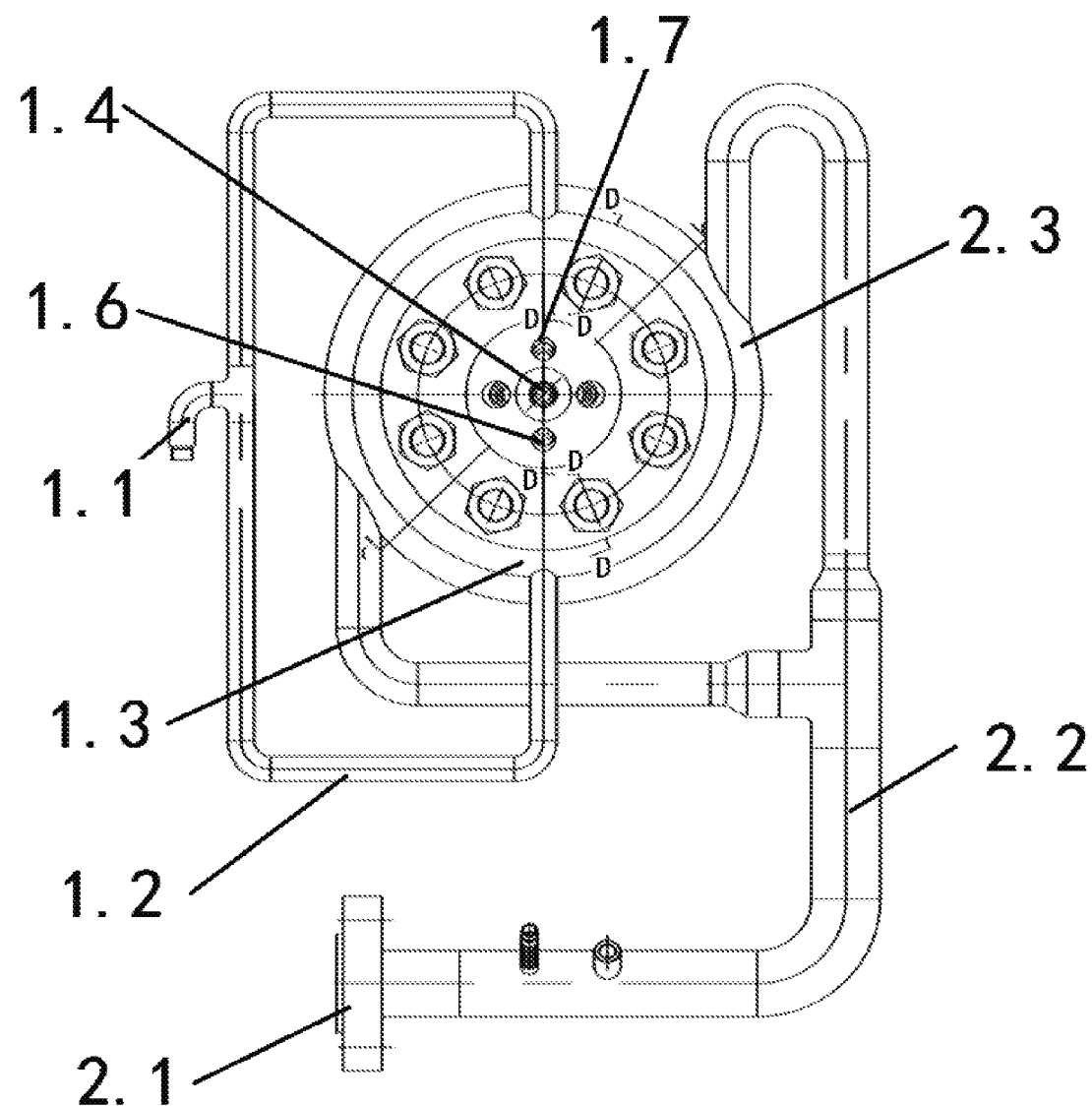
FIG. 2 is a left view of the present invention.
Figure 3:
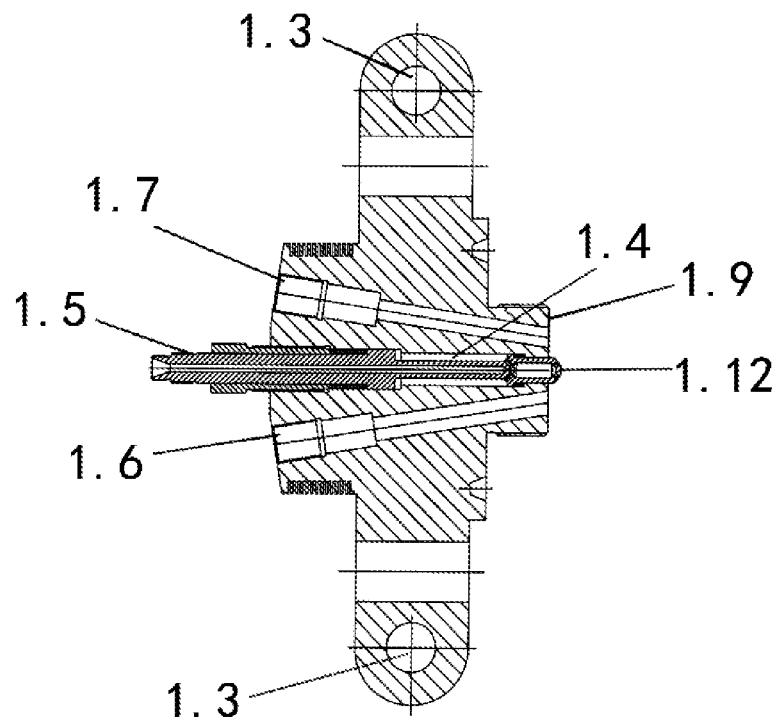
FIG. 3 is a cross-sectional view along D-D of a front end head in FIG. 2 of the present invention.
Figure 4:
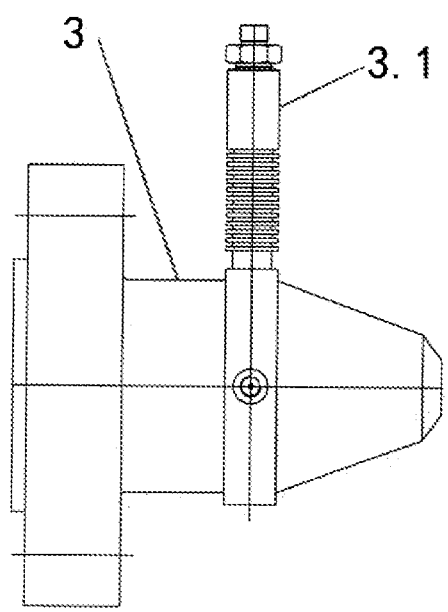
FIG. 4 is a view in a K direction of a rear end head of the present invention.
Figure 5:
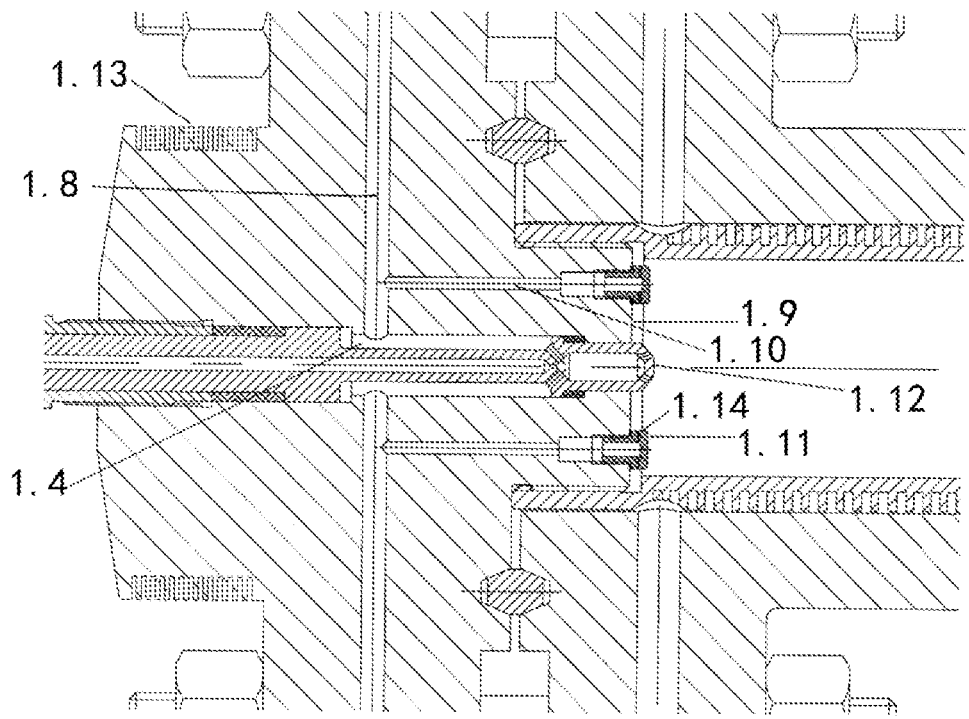
FIG. 5 is an enlarged view of a part A in FIG. 1 of the present invention.
Figure 6:
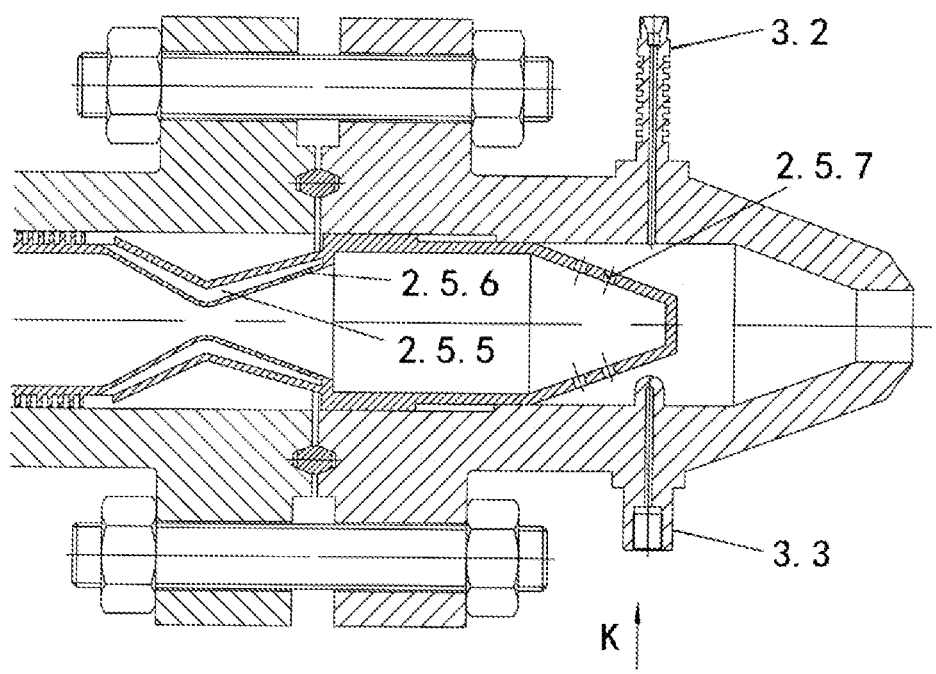
FIG. 6 is an enlarged view of a part B in FIG. 1 of the present invention.

In Embodiment 1, referring to FIG. 1 to FIG. 6, a dryness raiser for improving steam dryness of a steam injection boiler provided in the present invention mainly includes a front end head 1, a cylinder 2, and a rear end head 3. The front end head 1 is connected to the cylinder 2 by flanges, and the cylinder 2 is connected to the rear end head 3 by flanges.

A compressed air inlet 1.1, a compressed air connecting pipe 1.2, a compressed air inlet passage 1.3, a fuel pipe passage 1.4, a fuel pipe 1.5, an ignition lever passage 1.6, and a flame detector passage 1.7 are disposed on the front end head 1. The compressed air inlet passage 1.3, the fuel pipe passage 1.4, the ignition lever passage 1.6, and the flame detector passage 1.7 are separately connected to a combustion cylinder 2.5. The fuel pipe 1.5, an ignition lever, a flame detector, and respective corresponding passages are tightly fixed on the front end head 1 by threaded caps in a sealing form of graphite extrusion.

The compressed air inlet 1.1 is connected to the compressed air connecting pipe 1.2, and the compressed air connecting pipe 1.2 is connected to the compressed air inlet passage 1.3. The compressed air inlet passage 1.3 is an annular passage, provided in an outer edge of a flange of the front end head 1. A plurality of compressed air circulation holes 1.8 perpendicular to the front end head 1 are provided in the middle of a flange bolt hole of the front end head 1 in a compressed air inlet passage 1.3, and the compressed air inlet passage 1.3 is connected to the fuel pipe passage 1.4 by the compressed air circulation holes 1.8. A plurality of compressed air heat dissipation holes 1.10 are provided in a front end face 1.9 of the front end head 1, the compressed air heat dissipation holes 1.10 are perpendicular to and are connected to the compressed air circulation holes 1.8, air heat dissipation nozzles 1.11 are disposed at tail ends of the compressed air heat dissipation holes 1.10, the air heat dissipation nozzles 1.11 are tightly fixed on the front end face 1.9 of the front end head 1 by a threaded connection, and a plurality of air heat dissipation jet orifices 1.14 parallel to the front end face 1.9 are evenly distributed on circumferences of the air heat dissipation nozzles 1.11.

The middle of the fuel pipe 1.5 forms an annular space with the fuel pipe passage 1.4, and the annular space is connected to the compressed air circulation holes 1.8. An internal mixing fuel nozzle 1.12 is disposed at a front end of the fuel pipe 1.5, the internal mixing fuel nozzle 1.12 and the fuel pipe 1.5 are an integral structure, and the internal mixing fuel nozzle 1.12 and a tail end of the fuel pipe passage 1.4 are sealed by graphite extrusion.

A heat dissipation structure 1.13 is disposed on a rear section of the front end head 1.

A cooling medium inlet 2.1, a cooling medium connecting pipe 2.2, and a cooling medium passage 2.3 are provided at a front end of the cylinder 2.

The cooling medium passage 2.3 is an annular passage, provided in an outer edge of a flange of the front end of the cylinder 2. A plurality of cooling medium circulation holes 2.4 perpendicular to the cylinder 2 are provided in the middle of a flange bolt hole in the cooling medium passage 2.3, and the cooling medium passage 2.3 is connected to the inside of the cylinder 2 by the cooling medium circulation holes 2.4.

The cooling medium inlet 2.1 is connected to the cooling medium connecting pipe 2.2, the cooling medium inlet 2.1 uses a flange connection, the cooling medium connecting pipe 2.2 is connected to the cooling medium passage 2.3 by tangents in two ways, and two tangent intersection points are located on a diameter of the annular passage, and are opposite to each other by 180°. A pressure sensor interface and a temperature sensor interface are disposed on the cooling medium connecting pipe 2.2.

A combustion cylinder 2.5 is disposed inside the cylinder 2, and the combustion cylinder 2.5 is connected to a front end of the front end head 1 by a thread. The combustion cylinder 2.5 includes a combustion section 2.5.1, a throat section 2.5.2, and a mixing section 2.5.3. A multi-stage volute cooling medium passage 2.5.4 is provided in an outer wall of the combustion section 2.5.1. An annular conical cooling medium passage 2.5.5 is provided in an outer wall of the throat section 2.5.2. A plurality of cooling medium jet orifices 2.5.6 are provided at a tail end of the throat section, the cooling medium jet orifices 2.5.6 are connected to the mixing section 2.5.3, a plurality of composite gas jet orifices 2.5.7 are provided at a conical tail end of the mixing section 2.5.3, and the composite gas jet orifices 2.5.7 are connected to the inside of the cylinder 2.

A safety accessory interface 3.1, a pressure sensor interface 3.2, and a temperature sensor interface 3.3 are disposed on the rear end head 3, and outlets of these interfaces are of diameter-reducing structures.

According to the dryness raiser for improving steam dryness of a steam injection boiler provided in the present invention, use processes of the dryness raiser are as follows:

during startup, wet saturated steam enters an apparatus from the cooling medium inlet 2.1, compressed air is controlled to enter the apparatus from the compressed air inlet 1.1, and a fuel is then controlled to enter the apparatus from the fuel pipe 1.5; and meanwhile, an igniter is turned on according to setting parameters, the fuel is atomized by the compressed air in the internal mixing fuel nozzle 1.12 and injected into the combustion section 2.5.1 of the combustion cylinder 2.5, and a mixture of the fuel and the air can meet an open flame and combust;

during working, through the compressed air inlet 1.1, the compressed air inlet passage 1.3, and the compressed air circulation holes 1.8, one part of the compressed air enters the annular space formed by the fuel pipe (1.5) and the fuel pipe passage 1.4, and enters the internal mixing fuel nozzle 1.12 through the annular space, to fully atomize the fuel; meanwhile, during circulation, the compressed air adequately dissipates heat of the front end head 1, and an increase in the temperature of the compressed air also facilitates atomization of the fuel; the other part of the compressed air enters the compressed air heat dissipation holes 1.10, is sprayed out at a high speed through the air heat dissipation jet orifices 1.14 that are parallel to the front end face 1.9 and are evenly distributed on the circumferences of the air heat dissipation nozzles 1.11, and forms an air cooling film on a surface of the front end face of the front end head, so as to protect the front end face 1.9 of the front end head 1, an end head of the ignition lever, and an end head of the internal mixing fuel nozzle 1.12 from ablation in a high-temperature combustion state; and the integral structure of the fuel pipe 1.5 and the internal mixing fuel nozzle 1.12 is convenient to disassemble and replace in case that the internal mixing fuel nozzle 1.12 is damaged; and during working, the wet saturated steam enters the annular cooling medium passage 2.3 in directions of inverse tangents, and forms a strong rotational force; under the action of the rotational force, wet saturated steam of a two-phase flow is fully mixed in the annular cooling medium passage 2.3, and through the cooling medium circulation holes 2.4, evenly enters the multi-stage volute cooling medium passage 2.5.4 on an outer wall of the combustion cylinder 2.5; the multi-stage volute cooling medium passage 2.5.4 has a large heat dissipation area, time of circulation of the wet saturated steam on the outer wall of the combustion section 2.5.1 is long, and the wet saturated steam flows uniformly, so as to protect the combustion cylinder 2.5 from ablation of a high temperature; when the wet saturated steam goes through the annular conical cooling medium passage 2.5.5 on the outer wall of the throat section 2.5.2 of the combustion cylinder, the flow velocity of the wet saturated steam increases greatly, thereby ensuring that an interior of the throat section 2.5.2 is not ablated by high temperature flue gas; along the cooling medium jet orifices 2.5.6 at a tail end of the annular conical cooling medium passage 2.5.5, the wet saturated steam is injected into the mixing section 2.5.3 of the combustion cylinder 2.5 at a high speed, and rapidly exchanges heat with the high temperature flue gas after combustion to mix the wet saturated steam and the high temperature flue gas to form a composite gas, so as to greatly increase dryness of the wet saturated steam; according to process requirements, the dryness can be controlled to be increased to 100%, or even to a particular superheat degree, the composite gas is sprayed out from the composite gas jet orifices 2.5.7 at the tail end of the mixing section 2.5.3 of the combustion cylinder 2.5, and the conical structure and the jet orifice structure at the tail end of the mixing section 2.5.3 can ensure that the wet saturated steam and the high temperature flue gas are fully and evenly mixed when being sprayed out through the jet orifices; and a designed structure of the throat section 2.5.2 of the combustion cylinder 2.5 ensures that, after the combusted flue gas goes through the throat section 2.5.2, the flow velocity of the flue gas can approach the velocity of sound, thereby eliminating a phenomenon of flame oscillation in the combustion section 2.5.1, ensuring stable high-pressure combustion, and preventing the wet saturated steam in the mixing section 2.5.3 from flowing back into the combustion section 2.5.1 of the combustion cylinder 2.5 to avoid disturbing stability of flame. After corresponding apparatuses are mounted on the safety accessory interface 3.1, the pressure sensor interface 3.2, and the temperature sensor interface 3.3 disposed at a rear end of the high-pressure combustion apparatus, the apparatuses can detect a state of mixed composite gas, thereby ensuring safe operation of the high-pressure combustion apparatus.

It should be noted that, according to requirements of manufacturing process of the apparatus, a connection flange between the cylinder of the apparatus and the rear end head can be removed, and the cylinder and the rear end head are designed as an integral structure.

The foregoing descriptions are only preferred embodiments of the present invention, and a person skilled in the art all can use the foregoing technical solutions to modify or change them into equivalent technical solutions. Therefore, any simple changes and equivalent replacements according to the technical solutions of the present invention shall fall within the scope of the present invention.

What is claimed is:

1. A dryness raiser for improving steam dryness of a steam injection boiler, mainly comprising a front end head (1), a cylinder (2), and a rear end head (3), wherein the front end head (1) is connected to the cylinder (2) by flanges, and the cylinder (2) is connected to the rear end head (3) by flanges; on an outer edge of a flange of the front end head (1), a plurality of compressed air circulation holes (1.8) perpendicular to the front end head (1) are provided in the middle of a flange bolt hole of the front end head (1) in a compressed air inlet passage (1.3), and the compressed air inlet passage (1.3) is connected to a fuel pipe passage (1.4) by the compressed air circulation holes (1.8); a plurality of compressed air heat dissipation holes (1.10) are provided in a front end face (1.9) of the front end head (1), the compressed air heat dissipation holes (1.10) are perpendicular to and are connected to the compressed air circulation holes (1.8), air heat dissipation nozzles (1.11) are disposed at tail ends of the compressed air heat dissipation holes (1.10), and a plurality of air heat dissipation jet orifices (1.14) parallel to the front end face (1.9) are evenly distributed on circumferences of the air heat dissipation nozzles (1.11).

2. The dryness raiser for improving steam dryness of a steam injection boiler according to claim 1, wherein the middle of a fuel pipe (1.5) forms an annular space with the fuel pipe passage (1.4), and the annular space is connected to the compressed air circulation holes (1.8); an internal mixing fuel nozzle (1.12) is disposed at a front end of the fuel pipe (1.5), the internal mixing fuel nozzle (1.12) and the fuel pipe (1.5) are an integral structure, and the internal mixing fuel nozzle (1.12) and a tail end of the fuel pipe passage (1.4) are sealed by graphite extrusion.

3. The dryness raiser for improving steam dryness of a steam injection boiler according to claim 1, wherein a cooling medium inlet (2.1), a cooling medium connecting pipe (2.2), and a cooling medium passage (2.3) are provided at a front end of the cylinder (2), the cooling medium passage (2.3) is an annular passage, provided in an outer edge of a flange of the front end of the cylinder (2), a plurality of cooling medium circulation holes (2.4) perpendicular to the cylinder (2) are provided in the middle of a flange bolt hole in the cooling medium passage (2.3), and the cooling medium passage (2.3) is connected to the inside of the cylinder (2) by the cooling medium circulation holes (2.4); and the cooling medium inlet (2.1) is connected to the cooling medium connecting pipe (2.2), the cooling medium inlet (2.1) uses a flange connection, the cooling medium connecting pipe (2.2) is connected to the cooling medium passage (2.3) by tangents in two ways, and two tangent intersection points are located on a diameter of the annular passage, and are opposite to each other by 180°.

4. The dryness raiser for improving steam dryness of a steam injection boiler according to claim 1, wherein a combustion cylinder (2.5) is disposed inside the cylinder (2), and the combustion cylinder (2.5) is movably connected to a front end of the front end head (1); and the combustion cylinder (2.5) comprises a combustion section (2.5.1), a throat section (2.5.2), and a mixing section (2.5.3), a multi-stage volute cooling medium passage (2.5.4) is provided in an outer wall of the combustion section (2.5.1), an annular conical cooling medium passage (2.5.5) is provided in an outer wall of the throat section (2.5.2), a plurality of cooling medium jet orifices (2.5.6) are provided at a tail end of the throat section, the cooling medium jet orifices (2.5.6) are connected to the mixing section (2.5.3), a plurality of composite gas jet orifices (2.5.7) are provided at a conical tail end of the mixing section (2.5.3), and the composite gas jet orifices (2.5.7) are connected to the inside of the cylinder (2).

5. The dryness raiser for improving steam dryness of a steam injection boiler according to claim 1, wherein a compressed air inlet (1.1) is connected to a compressed air connecting pipe (1.2), and the compressed air connecting pipe (1.2) is connected to the compressed air inlet passage (1.3); and the compressed air inlet passage (1.3) is an annular passage, provided in the outer edge of the flange of the front end head (1).

6. The dryness raiser for improving steam dryness of a steam injection boiler according to claim 1, wherein a safety accessory interface (3.1), a pressure sensor interface (3.2), and a temperature sensor interface (3.3) are disposed on the rear end head (3), and outlets of these interfaces are of diameter-reducing structures.

7. The dryness raiser for improving steam dryness of a steam injection boiler according to claim 1, wherein a heat dissipation structure (1.13) is disposed on a rear section of the front end head (1).

8. The dryness raiser for improving steam dryness of a steam injection boiler according to claim 1, wherein the compressed air inlet passage (1.3), the fuel pipe passage (1.4), an ignition lever passage (1.6), and a flame detector passage (1.7) are separately connected to a combustion cylinder (2.5), and a fuel pipe (1.5), an ignition lever, a flame detector, and respective corresponding passages are tightly fixed on the front end head (1) by threaded caps in a sealing form of graphite extrusion.

9. A method for using the dryness raiser for improving steam dryness of a steam injection boiler according to claim 1, comprising the following processes:

during startup, wet saturated steam enters an apparatus from a cooling medium inlet (2.1), compressed air is controlled to enter the apparatus from a compressed air inlet (1.1), and a fuel is then controlled to enter the apparatus from a fuel pipe (1.5); and meanwhile, an igniter is turned on according to setting parameters, the fuel is atomized by the compressed air in an internal mixing fuel nozzle (1.12) and injected into a combustion section (2.5.1) of a combustion cylinder (2.5), and a mixture of the fuel and the air can meet an open flame and combust;

during working, through the compressed air inlet (1.1), the compressed air inlet passage (1.3), and the compressed air circulation holes (1.8), one part of the compressed air enters an annular space formed by the fuel pipe (1.5) and the fuel pipe passage (1.4), and enters the internal mixing fuel nozzle (1.12) through the annular space, to fully atomize the fuel;

meanwhile, during circulation, the compressed air adequately dissipates heat of the front end head (1), and an increase in the temperature of the compressed air also facilitates atomization of the fuel; an other part of the compressed air enters the compressed air heat dissipation holes (1.10), is sprayed out at a high speed through the air heat dissipation jet orifices (1.14) that are parallel to the front end face (1.9) and are evenly distributed on the circumferences of the air heat dissipation nozzles (1.11), and forms an air cooling film on a surface of the front end face of the front end head, so as to protect the front end face (1.9) of the front end head (1), an end head of an ignition lever, and an end head of the internal mixing fuel nozzle (1.12) from ablation in a high-temperature combustion state; and an integral structure of the fuel pipe (1.5) and the internal mixing fuel nozzle (1.12) is convenient to disassemble and replace in case that the internal mixing fuel nozzle (1.12) is damaged; and during working, the wet saturated steam enters an annular cooling medium passage (2.3) in directions of inverse tangents, and forms a strong rotational force; under the action of the rotational force, wet saturated steam of a two-phase flow is fully mixed in the annular cooling medium passage (2.3), and through cooling medium circulation holes (2.4), evenly enters a multi-stage volute cooling medium passage (2.5.4) on an outer wall of the combustion cylinder (2.5); the multi-stage volute cooling medium passage (2.5.4) has a large heat dissipation area, time of circulation of the wet saturated steam on an outer wall of the combustion section (2.5.1) is long, and the wet saturated steam flows uniformly, so as to protect the combustion cylinder (2.5) from ablation of a high temperature; when the wet saturated steam goes through an annular conical cooling medium passage (2.5.5) on an outer wall of a throat section (2.5.2) of the combustion cylinder, a flow velocity of the wet saturated steam increases greatly, thereby ensuring that an interior of the throat section (2.5.2) is not ablated by high temperature flue gas; along cooling medium jet orifices (2.5.6) at a tail end of the annular conical cooling medium passage (2.5.5), the wet saturated steam is injected into a mixing section (2.5.3) of the combustion cylinder (2.5) at a high speed, and rapidly exchanges heat with a high temperature flue gas after combustion to mix the wet saturated steam and the high temperature flue gas to form a composite gas, so as to greatly increase dryness of the wet saturated steam; according to process requirements, the dryness can be controlled to be increased to 100%, or even to a particular superheat degree, the composite gas is sprayed out from a plurality of composite gas jet orifices (2.5.7) at a tail end of the mixing section (2.5.3) of the combustion cylinder (2.5), and a conical structure and a jet orifice structure at the tail end of the mixing section (2.5.3) can ensure that the wet saturated steam and the high temperature flue gas are fully and evenly mixed when being sprayed out through jet orifices; and a designed structure of the throat section (2.5.2) of the combustion cylinder (2.5) ensures that, after a combusted flue gas goes through the throat section (2.5.2), a flow velocity of the flue gas can approach a velocity of sound, thereby eliminating a phenomenon of flame oscillation in the combustion section (2.5.1), ensuring stable high-pressure combustion, and preventing the wet saturated steam in the mixing section (2.5.3) from flowing back into the combustion section (2.5.1) of the combustion cylinder (2.5) to avoid disturbing stability of flame.

10. The method for using the dryness raiser for improving steam dryness of a steam injection boiler according to claim 9, wherein a middle of the fuel pipe (1.5) forms the annular space with the fuel pipe passage (1.4), and the annular space is connected to the compressed air circulation holes (1.8); the internal mixing fuel nozzle (1.12) is disposed at a front end of the fuel pipe (1.5), and the internal mixing fuel nozzle (1.12) and a tail end of the fuel pipe passage (1.4) are sealed by graphite extrusion.

11. The method for using the dryness raiser for improving steam dryness of a steam injection boiler according to claim 9, wherein the cooling medium inlet (2.1), a cooling medium connecting pipe (2.2), and the annular cooling medium passage (2.3) are provided at a front end of the cylinder (2), provided in an outer edge of a flange of the front end of the cylinder (2), the cooling medium circulation holes (2.4) perpendicular to the cylinder (2) are provided in the middle of a flange bolt hole in the annular cooling medium passage (2.3), and the annular cooling medium passage (2.3) is connected to the inside of the cylinder (2) by the cooling medium circulation holes (2.4); and the cooling medium inlet (2.1) is connected to a cooling medium connecting pipe (2.2), the cooling medium inlet (2.1) uses a flange connection, the cooling medium connecting pipe (2.2) is connected to the annular cooling medium passage (2.3) by tangents in two ways, and two tangent intersection points are located on a diameter of the annular cooling medium passage, and are opposite to each other by 180°.

12. The method for using the dryness raiser for improving steam dryness of a steam injection boiler according to claim 9, wherein the combustion cylinder (2.5) is disposed inside the cylinder (2), and the combustion cylinder (2.5) is movably connected to a front end of the front end head (1); and the combustion cylinder (2.5) comprises the combustion section (2.5.1), the throat section (2.5.2), and the mixing section (2.5.3), the multi-stage volute cooling medium passage (2.5.4) is provided in an outer wall of the combustion section (2.5.1), the annular conical cooling medium passage (2.5.5) is provided in the outer wall of the throat section (2.5.2), the plurality of cooling medium jet orifices (2.5.6) are provided at a tail end of the throat section, the cooling medium jet orifices (2.5.6) are connected to the mixing section (2.5.3), the plurality of composite gas jet orifices (2.5.7) are provided at a conical tail end of the mixing section (2.5.3), and the composite gas jet orifices (2.5.7) are connected to the inside of the cylinder (2).

13. The method for using the dryness raiser for improving steam dryness of a steam injection boiler according to claim 9, wherein the compressed air inlet (1.1) is connected to a compressed air connecting pipe (1.2), and the compressed air connecting pipe (1.2) is connected to the compressed air inlet passage (1.3); and the compressed air inlet passage (1.3) is an annular passage, provided in the outer edge of the flange of the front end head (1).

14. The method for using the dryness raiser for improving steam dryness of a steam injection boiler according to claim 9, wherein a safety accessory interface (3.1), a pressure sensor interface (3.2), and a temperature sensor interface (3.3) are disposed on the rear end head (3), and outlets of these interfaces are of diameter-reducing structures.

15. The method for using the dryness raiser for improving steam dryness of a steam injection boiler according to claim 9, wherein a heat dissipation structure (1.13) is disposed on a rear section of the front end head (1).

16. The method for using the dryness raiser for improving steam dryness of a steam injection boiler according to claim 9, wherein the compressed air inlet passage (1.3), the fuel pipe passage (1.4), an ignition lever passage (1.6), and a flame detector passage (1.7) are separately connected to the combustion cylinder (2.5), and the fuel pipe (1.5), the ignition lever, a flame detector, and respective corresponding passages are tightly fixed on the front end head (1) by threaded caps in a sealing form of graphite extrusion.

\* \* \* \* \*